United States Patent
Patterson et al.

(10) Patent No.: US 6,343,545 B1
(45) Date of Patent: *Feb. 5, 2002

(54) OUTDOOR KITCHEN WITH MOVABLE COOKING UNIT

(76) Inventors: Vance M. Patterson; Mary J. Patterson, both of 4950 Caterbury Pl., Morganton, NC (US) 28655; Donald J. Thomas, 2923 S. Pebble Beach Dr., Evergreen, CO (US) 80439

( * ) Notice: Subject to any disclaimer, the term of this patent is extended or adjusted under 35 U.S.C. 154(b) by 0 days.

This patent is subject to a terminal disclaimer.

(21) Appl. No.: 09/426,001

(22) Filed: Oct. 25, 1999

Related U.S. Application Data (63) Continuation-in-part of application No. 09/044,184, filed on Mar. 19, 1998, now Pat. No. 5,970,855.

(51) Int. Cl.[7] .................................................. A47J 37/07
(52) U.S. Cl. ........................ 99/423; 99/425; 99/443 R; 99/446
(58) Field of Search ........................... 99/422, 423, 425, 99/443 R, 446, 427, 450; 126/276

(56) References Cited

U.S. PATENT DOCUMENTS

| | | | |
|---|---|---|---|
| 246,561 A | | 8/1881 | Sassinot et al. |
| 360,372 A | * | 3/1887 | Calone et al. |
| 796,593 A | * | 8/1905 | Mohan |
| 2,740,395 A | * | 4/1956 | Goodwin ...................... 126/25 |
| 2,817,331 A | * | 12/1957 | Kaplan et al. ................. 126/41 |
| 2,907,316 A | * | 10/1959 | Windust ......................... 126/9 |
| 2,920,177 A | * | 1/1960 | Brane ........................... 219/35 |
| 3,330,204 A | * | 7/1967 | Little ........................... 99/339 |
| 3,552,299 A | * | 1/1971 | Patoka ......................... 99/339 |
| 3,664,321 A | | 5/1972 | Chiou ............................ 126/9 |
| 3,928,045 A | | 12/1975 | Tsunoda et al. ............... 99/330 |
| 4,063,497 A | * | 12/1977 | Thompson .................... 99/423 |
| 4,144,870 A | | 3/1979 | Reynolds .................. 126/41 E |
| 4,840,118 A | | 6/1989 | Rinehart ...................... 99/446 |
| 4,862,792 A | | 9/1989 | Lerma, Jr. .................... 99/401 |
| 4,882,985 A | * | 11/1989 | Beller .......................... 99/426 |
| 4,957,039 A | * | 9/1990 | Reyes .......................... 99/340 |
| 5,213,027 A | | 5/1993 | Tsotsos et al. ................ 99/339 |
| 5,529,053 A | | 6/1996 | Carter et al. ............... 126/25 R |
| 5,765,469 A | * | 6/1998 | Schloss et al. ................ 99/337 |
| 5,865,099 A | * | 2/1999 | Waugh ......................... 99/340 |
| 5,970,855 A | * | 10/1999 | Patterson et al. ............. 99/422 |
| 6,024,013 A | * | 2/2000 | Goharrizi ..................... 99/327 |

* cited by examiner

*Primary Examiner*—Keith Hendricks
*Assistant Examiner*—Drew Becker
(74) *Attorney, Agent, or Firm*—Sughrue Mion, PLLC

(57) ABSTRACT

A grill or kitchen unit for outdoor use, and includes a cooking unit which is translatable between a position over a heat source and a position laterally adjacent to the heat source, for cooling and/or further preparation of foods being cooked within the unit.

32 Claims, 13 Drawing Sheets

OUTDOOR KITCHEN WITH MOVABLE COOKING UNIT

CROSS-REFERENCE TO RELATED APPLICATIONS

This applications is a Continuation-In-Part of U.S. application Ser. No. 09/044,184, filed Mar. 19, 1998, now U.S. Pat. No. 5,970,855 the disclosure of which is incorporated herein by reference.

BACKGROUND OF THE INVENTION

1. Field of the Invention

The invention relates to a portable grill or portable kitchen unit designed for outdoor use, and in particular to an outdoor portable kitchen unit which includes a cooking unit which is translatable between a position over a heat source and a position laterally adjacent to the heat source, for cooling and/or further preparation of the foods being cooked within the unit.

2. Description of the Related Art

Portable outdoor grills have been known for many years, and recently the trend has been toward more complex units, offering larger cooking areas and greater degree of heat source control. However, a need has existed for units with incorporated food preparation areas, as well as a more convenient means of removing the cooked foods from the burner region for cooling an/or further preparation. It is therefore an object of the present invention to fulfil these needs, by providing a portable kitchen unit having food preparation areas on either side of the cooking area, and being provided with a grill or grate-style cooking surface which, together with an incorporated grate support/surround and a hood unit, is translatable fully laterally to one side of the heat source/burners, so as to provide a convenient means of removing the cooked foods from the heat source for cooling and/or further preparation.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which:

FIGS. 13A–15B illustrate the gas burners; and

DETAILED DESCRIPTION OF THE PREFERRED EMBODIMENTS

Figure 1A:
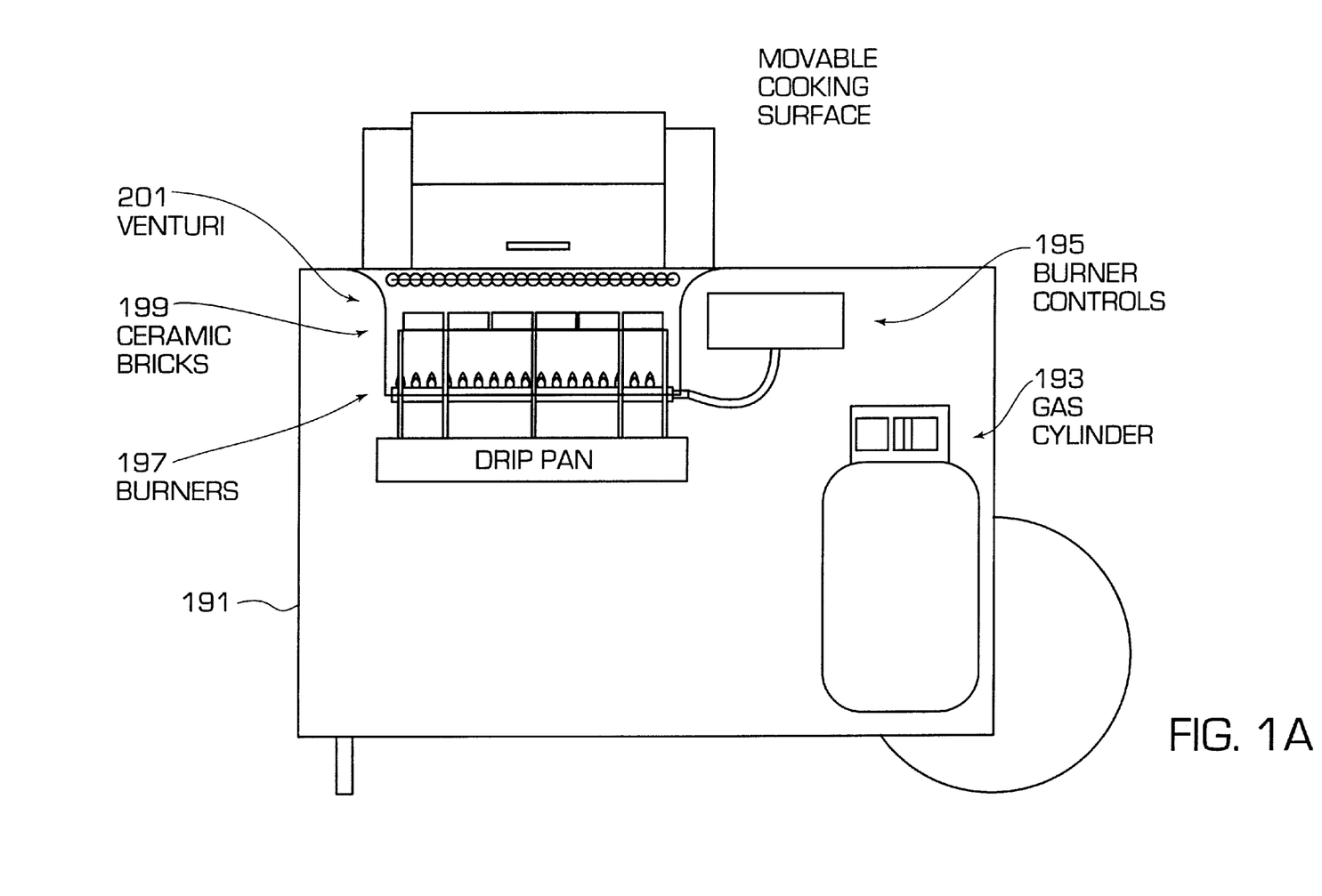
FIGS. 1A–1D are views of the front, side and top of the portable kitchen of the invention, with FIG. 1A schematically illustrating the primary internal components.

FIG. 1A illustrates schematically the general constitution of the portable kitchen unit, with base 191 housing a removable gas cylinder 193, gas burner controls 195 and burners 197 of conventional type. Above burners 197 are located a series of ceramic bricks 199 for heat retention and uniform heat radiation for cooking. A grate or grill 110 of conventional form is located a short distance above ceramic bricks 199. Ceramic bricks 199, and, to some extent, burners 197, are located within venturi 201, and together constitute the heat source for the invention. Venturi 201 is described in U.S. Pat. No. 5,529,053, and has several inherent advantages over conventional grill bodies. The disclosure of said patent is hereby incorporated herein by reference.

Figure 1B:
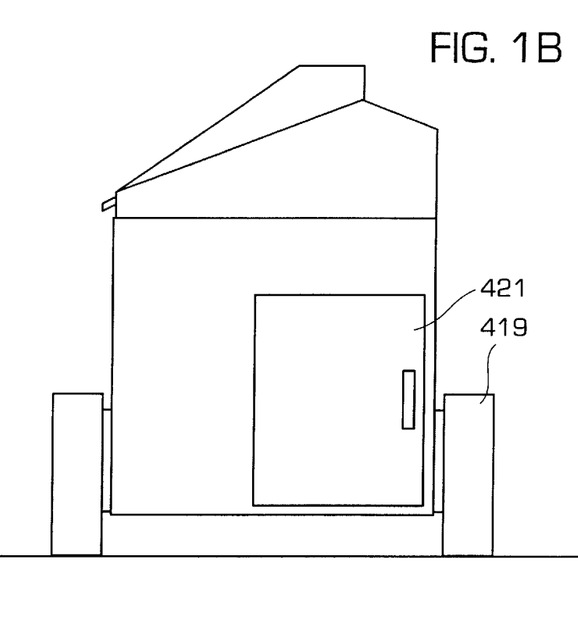
Figure 1C:
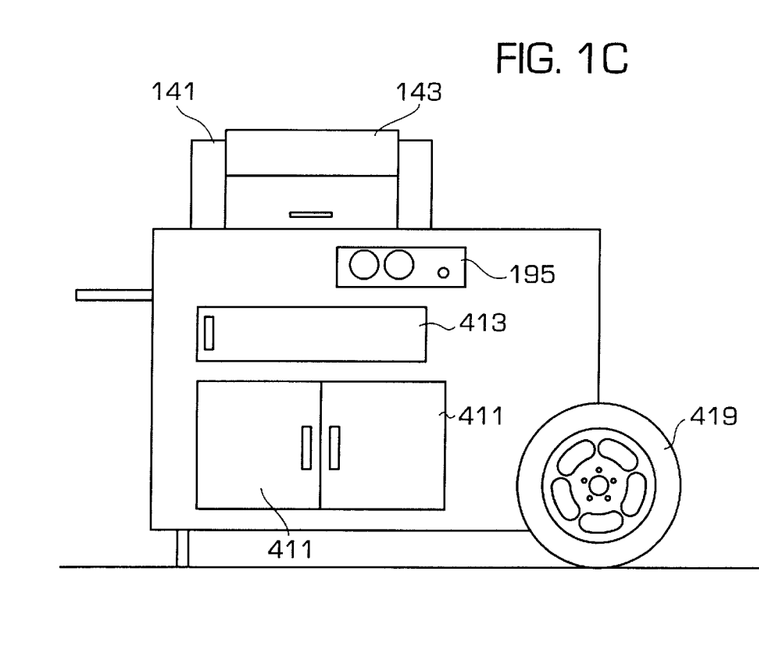

FIGS. 1B and 1C illustrate the external appearance of the portable kitchen, wherein base 191 is provided with storage areas, which may include a refrigerated compartment, accessed by doors 411, and drip pan access via door 421. The unit is mounted on at least two wheels 419 for portability, and includes door 421 shown in FIG. 1B for access to and replacement or replenishment of gas cylinder 193.

Figure 1D:
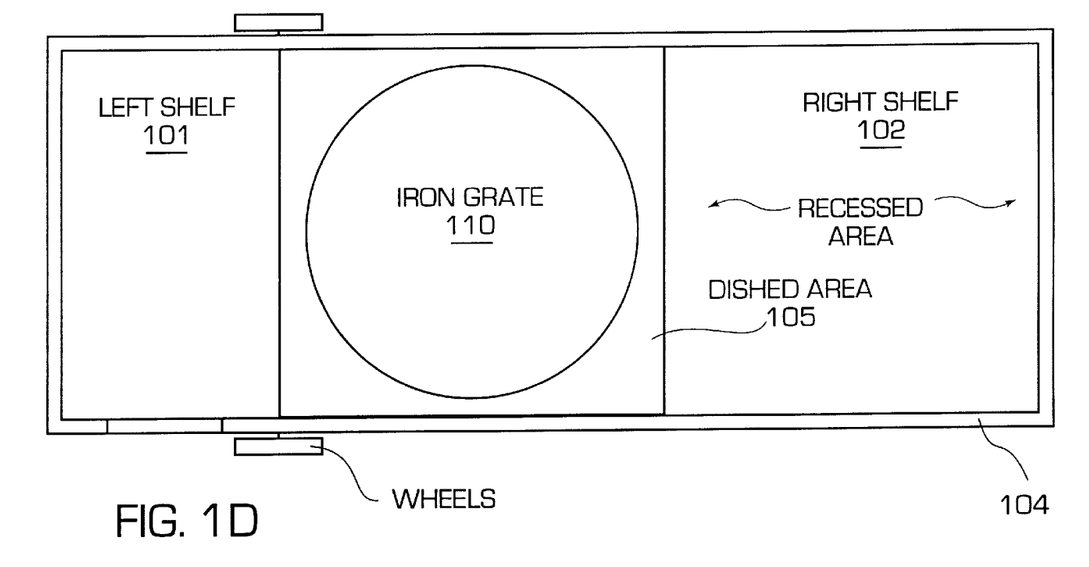
Figure 2:
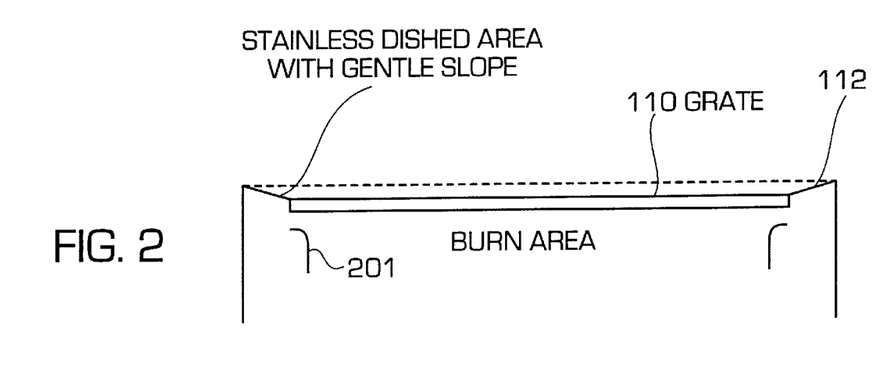
FIG. 2 schematically illustrates the cooking area.

As shown in FIG. 1D, the top surface of the portable kitchen unit is of generally rectangular cross-section and includes a left shelf 101 and a right shelf 102 for, e.g., food preparation, on either side of a movable cooking area generally designated by numeral 103. The shelves may be surfaced with a hard, non-porous material such as ceramic tile, Corian or similar materials such as are commonly used for countertops and/or cutting boards. The shelves 101, 102 and cooking area 103 are surrounded by a small ledge 104 to limit spillage. and to prevent items such as cooking utensils or food items from inadvertently falling off the shelf surfaces. Cooking area 103 includes grill surface or grate 110 of conventional form, surrounded and supported by rectangular dished member 105, which may be constructed of stainless steel. The dished member 105, as best seen in the cross-sectional view of FIG. 2, has an upper surface 112 having a slight slope. The surface 112 may be of substantially conical form overall, or may be formed of four planar but equally sloped sides, and is surrounded by a flat outer ledge 115, shown best in FIG. 3. The inner peripheral portion 117 of the dished member 105 is of annular form, and provides support for the outer periphery of grill or grate 110. In addition to providing for easy cleaning, the dished member 105 also allows spattered grease or oil to flow back toward the cooking surface, rather than outward toward ledges 101, 102.

Figure 3:
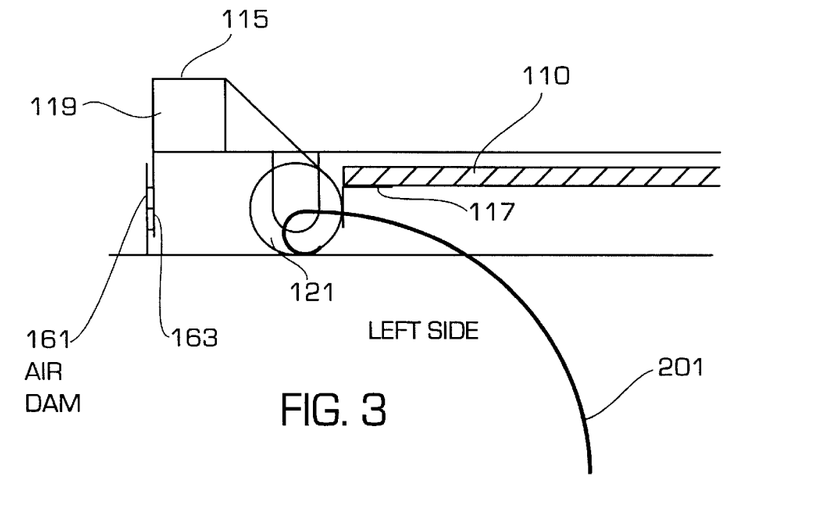
FIGS. 3–5 illustrate details of the translation assembly.
Figure 4:
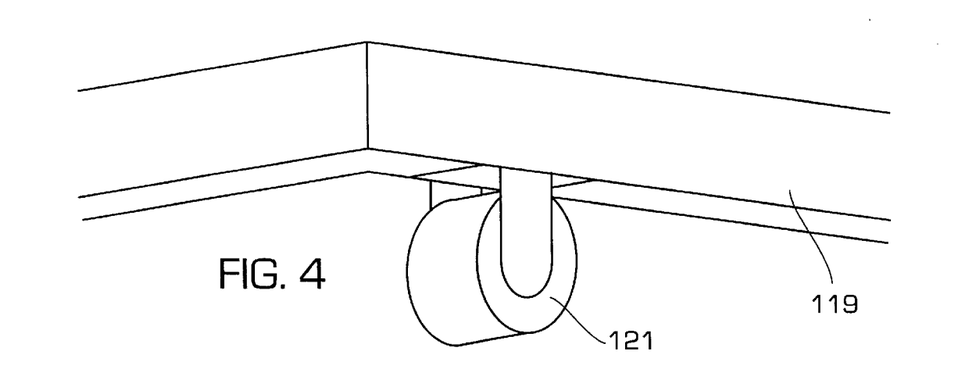

Referring further to FIG. 3, the mechanism for translating the cooking surface is shown. Under ledge 115 is located a square frame 119 which extends beneath the entire periphery of the ledge. At four locations of the frame 119, near corners thereof, as shown in FIG. 4, are located small wheels or casters 121 which support the frame 119, the dished member 105, the grate 110 and hood 140 (described below). The casters 121 are arranged so as to be radially outboard of both grate 110 and the underlying venturi 201.

Figure 5:
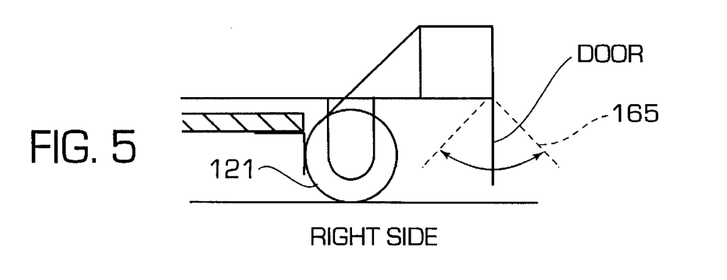

The normal cooking position is shown in FIG. 3, where the grate 117 is centered above the opening of venturi 201. As shown, the casters 121 are located approximately even with a tangent of the venturi 201 drawn in the widthwise direction of the shelves 101, 102. At the leftmost end of dished member 105 is formed an air dam 161, a portion of which is formed by a skirt 163 extending downwardly from frame element 119. At the rightmost side, shown in FIG. 5, the skirt 165 is hinged, to allow for movement of the dished member/grate combination over obstructions, such as an auxiliary deck, cutting surface or drip pan (not shown) located on the top surface of shelf 102. Thus, with reference to FIG. 1D, the entire cooking unit, composed of dished member 105, grate 110 and hood 140, can be translated from the illustrated position to a position at the extreme right of shelf 102, with the hinged skirt 165 in this position being displaced slightly by the right hand portion of ledge 104. Although not shown in FIG. 1, casters 121 would be located beneath dished surface 105 at locations approximately denoted by characters "X" in the figure, proximate the front and rear portions of ledge 104.

Although not shown in the drawings, venturi 201 may be fitted with a fixed or removable second grate located below grate 110, such that when the cooking unit is translated to the right in FIG. 1, cooking of other foods may be performed simultaneously with the cooling and/or further preparation of the foods on grate 110.

Figure 5A:
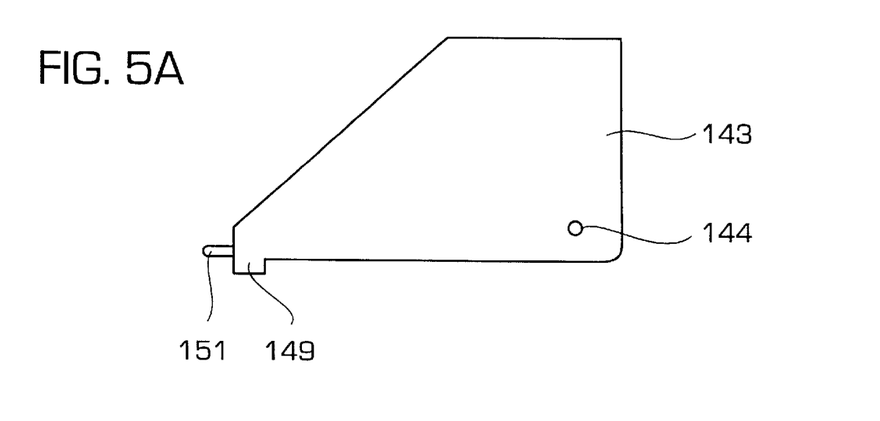
FIGS. 5A–5C illustrate details of the hood assembly.
Figure 5B:
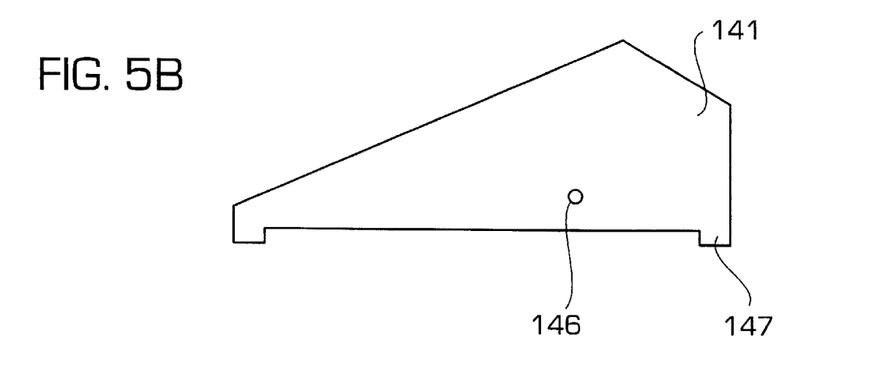
Figure 5C:
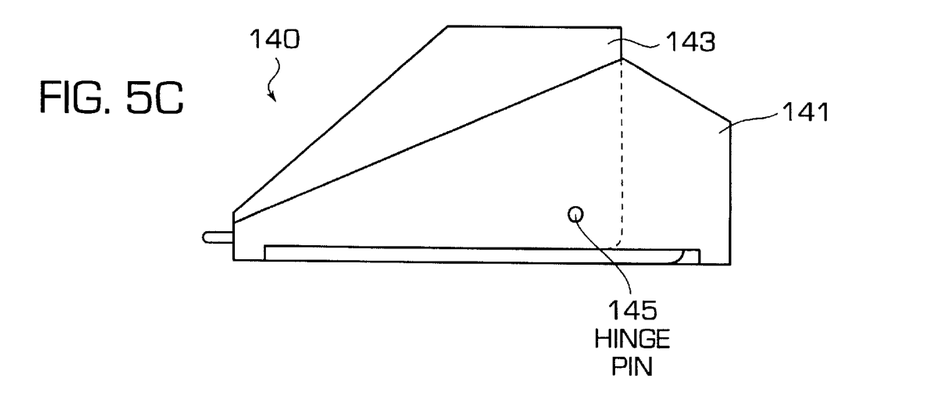

FIGS. 5A–5C illustrate the hood assembly 140, which includes stationary portion 141 and rotatable lid portion 143. The lid portion 143, shown separately in FIG. 5A, is essentially trapezoidal in cross-section, and includes handle 151 at its front end and fittings 144 for hinge pins 145 at its rear end.

Lid 143 is pivotally mounted with respect to stationary portion 141, pictured separately in FIG. 5B. Stationary portion 141 is of polygonal shape and includes fittings 146 for hinge pins 145, which form the pivotal mount for lid 143. At its front and rear ends, stationary portion 141 includes lips 147 which fit over frame 119 of dished member 105 and may be suitably affixed thereto. Lid 143 also includes lip 149 which fits over frame 119 when the lid is closed, the lips 147 and 149 being coincident in downward extension, when lid 143 is closed, to present an essentially unbroken line when viewed from the front of the portable kitchen. As noted above, since the hood assembly 140 is mounted to the dished member 105, it is translatable therewith when the former is moved to the right or left in FIG. 1.

Figure 6:
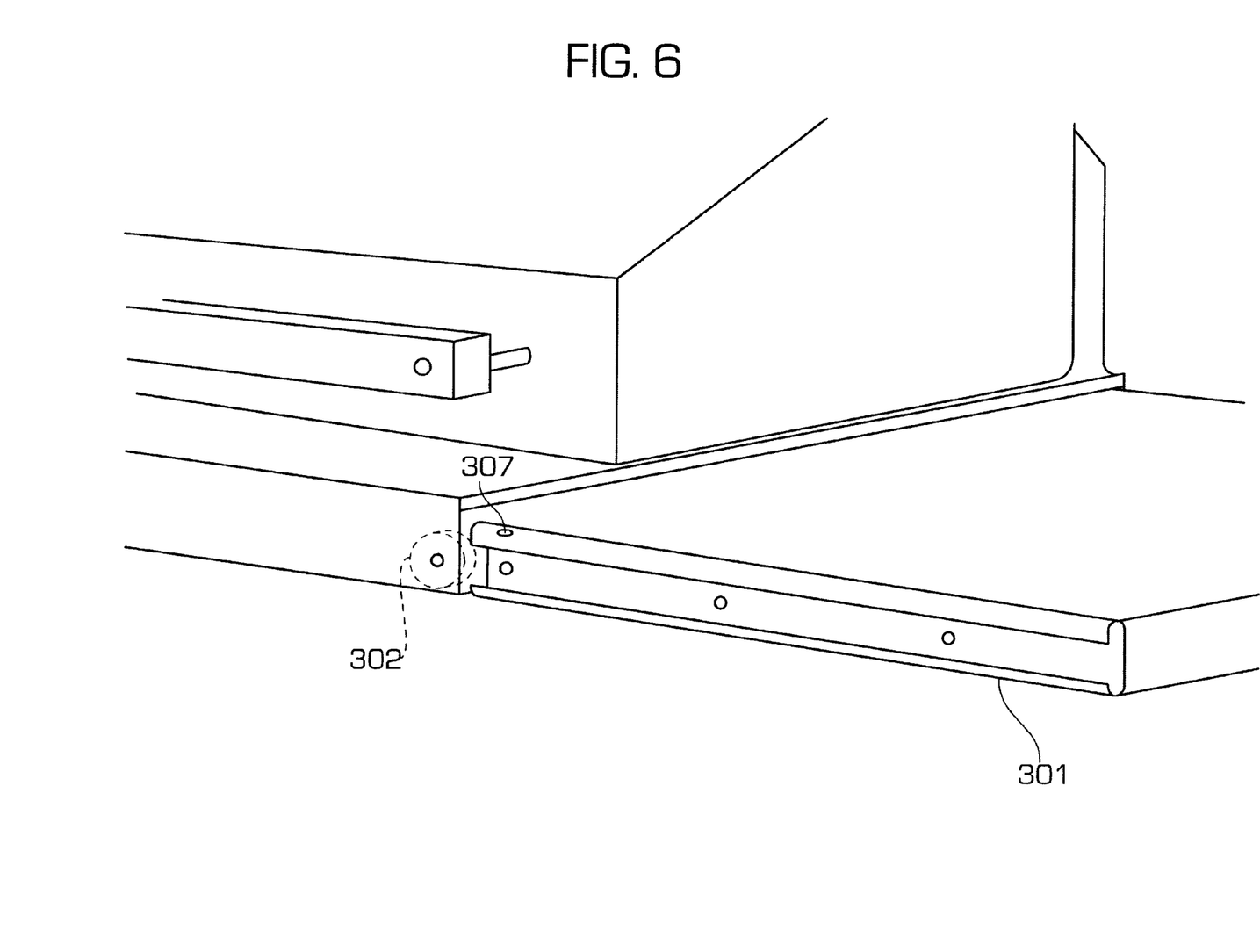
FIGS. 6 and 7 illustrate details of the parallel tracks and cotterless pin.
Figure 7:
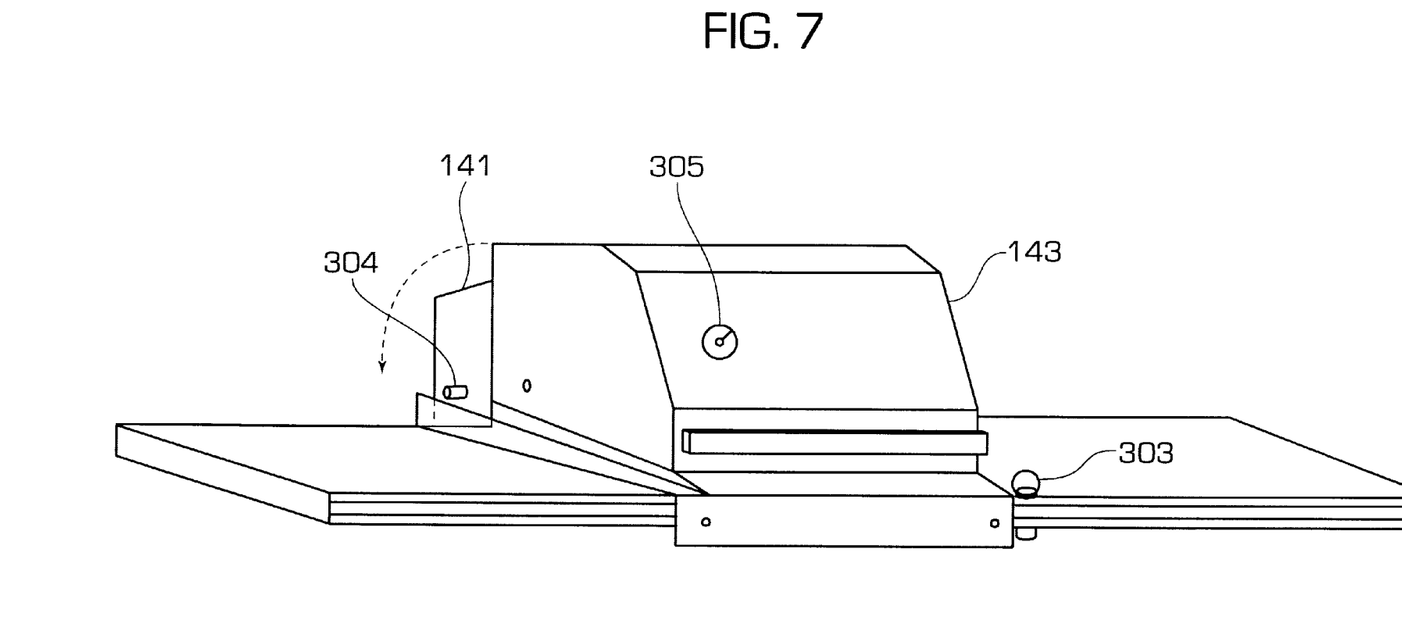
Figure 8:
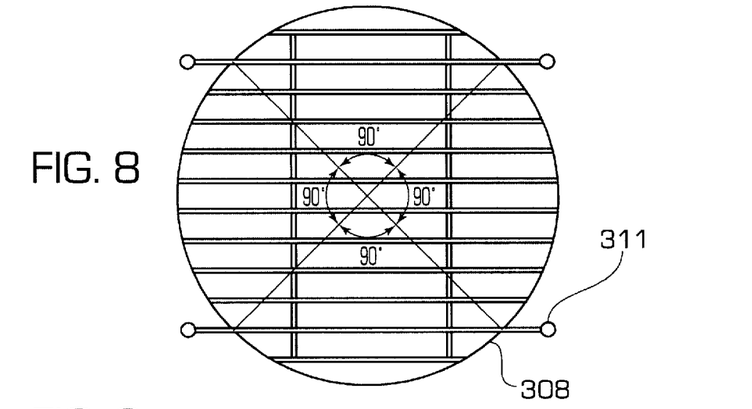
FIGS. 8 and 9 illustrate the cooking grate which is supported to provide a "Lazy Susan" effect.
Figure 9:
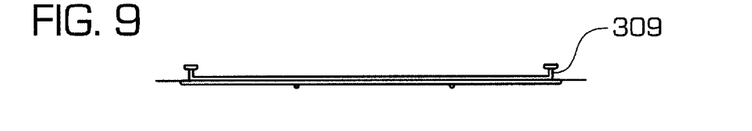
Figure 10A:
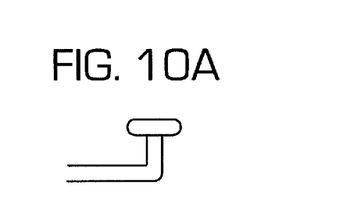
FIGS. 10A–10B illustrate knobs used for manual rotation of the grate.
Figure 10B:
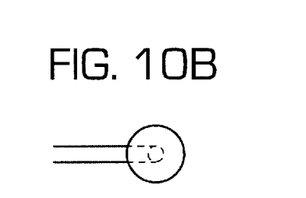
Figure 11:
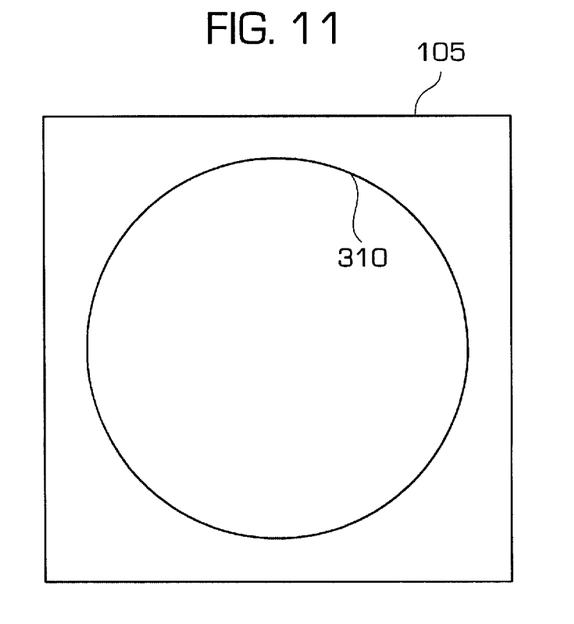
FIGS. 11–12 illustrate the opening for the grate and details of the grate.
Figure 12:
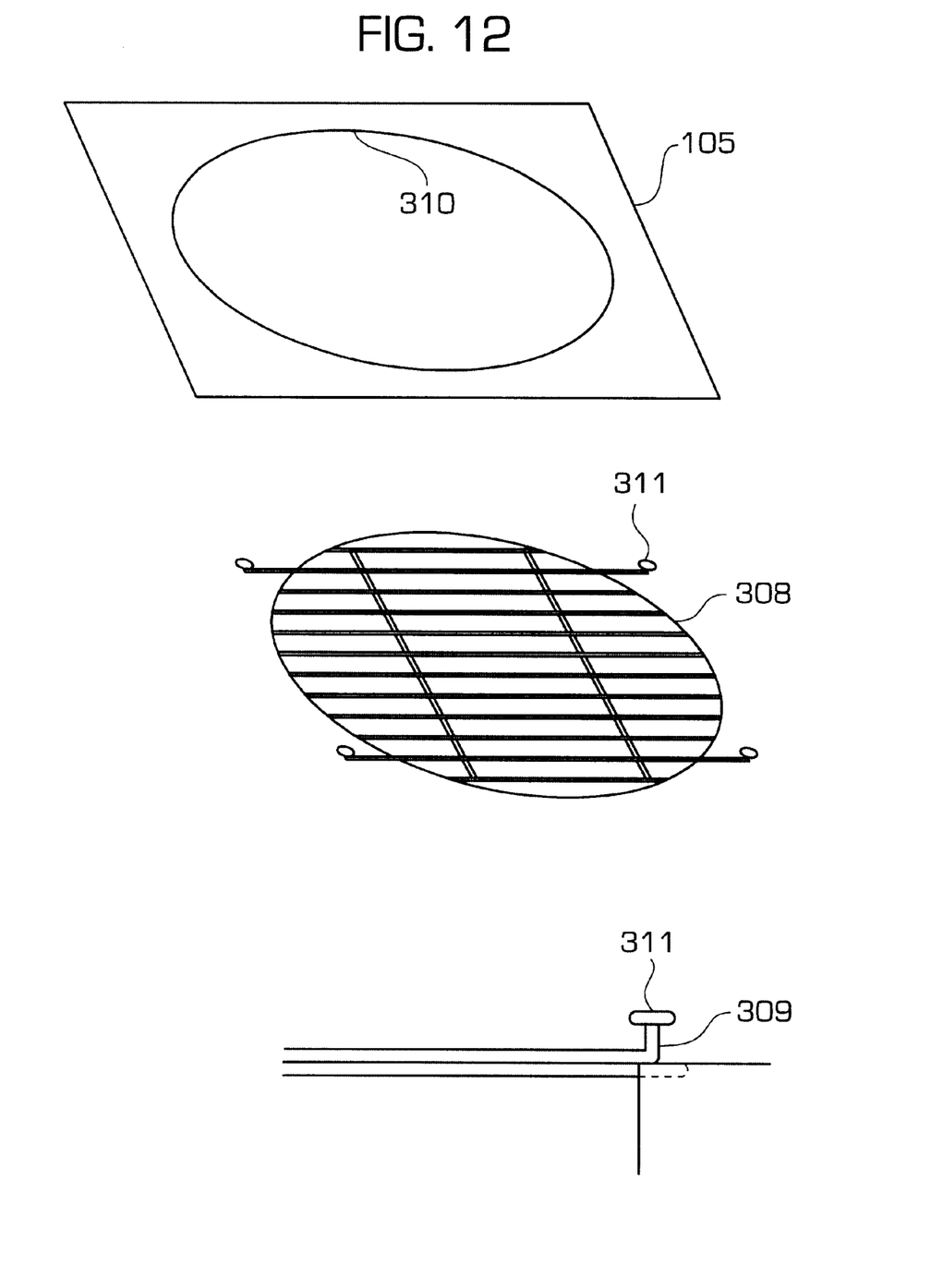
Figure 13A:
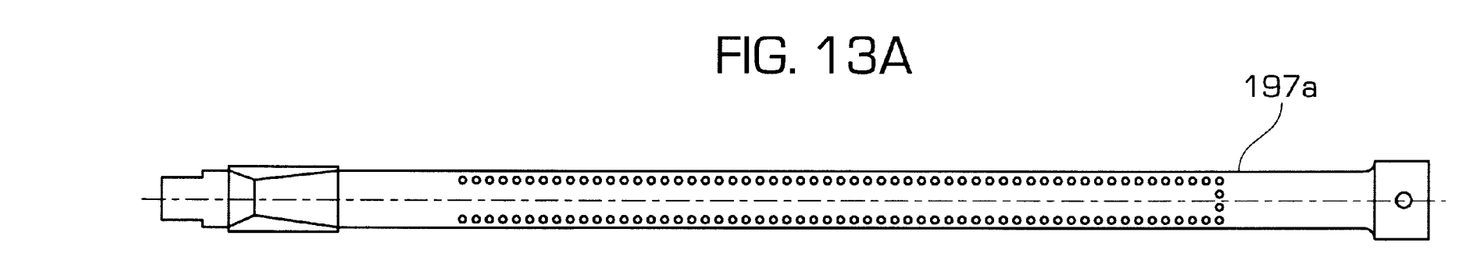
Figure 13B:
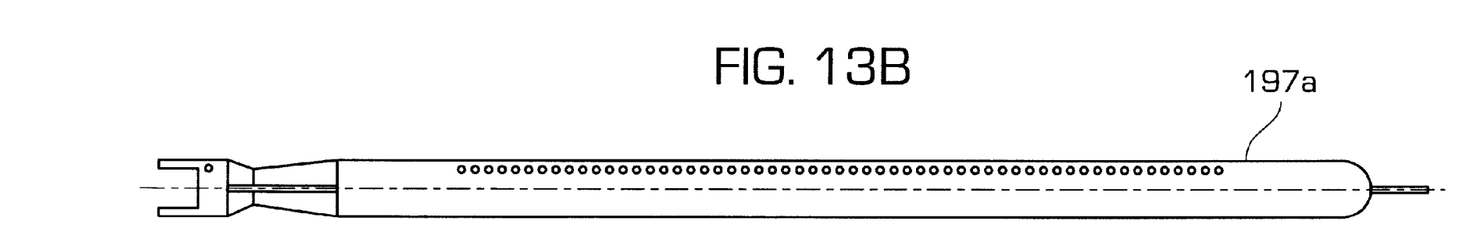
Figures 14A, 14B:
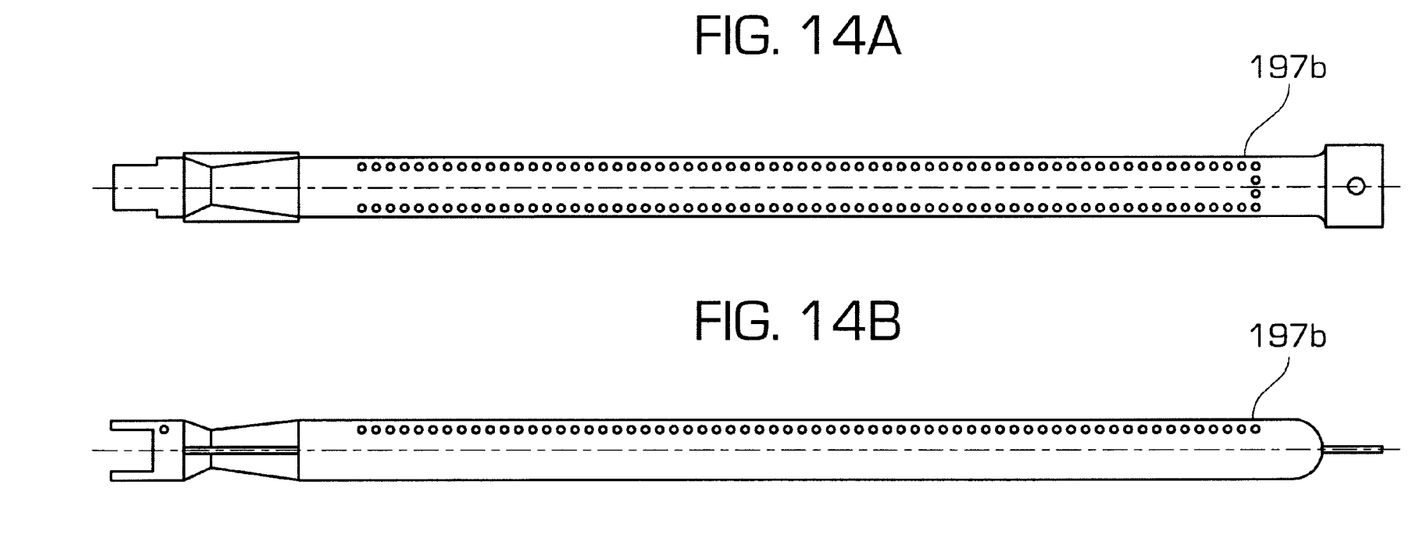
Figure 15A:
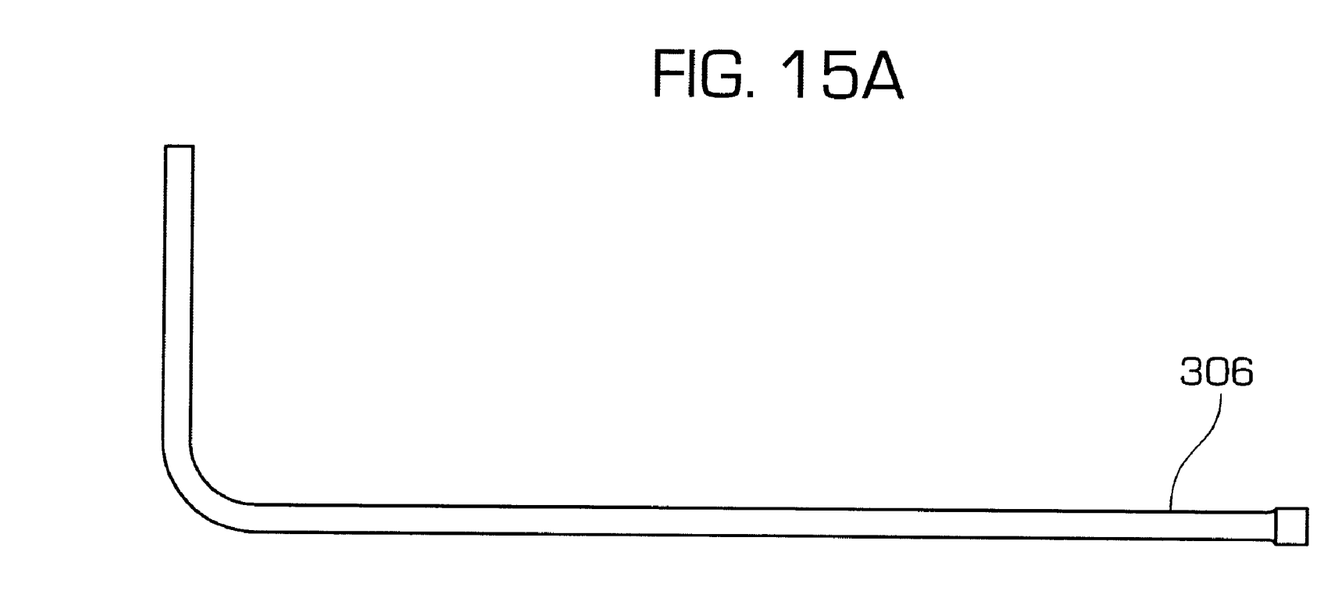
Figure 15B:
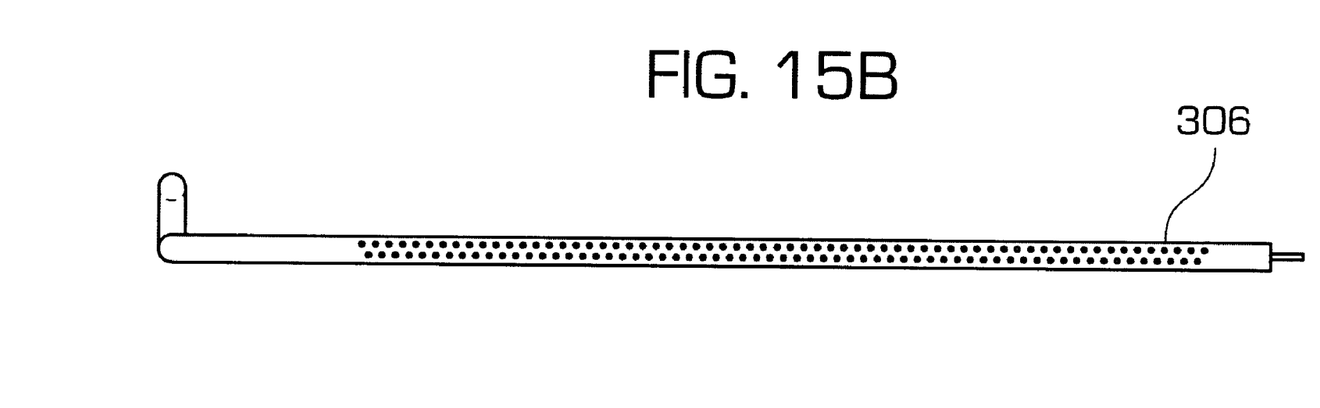

In another embodiment of the present invention as shown in FIGS. 6 and 7, the support for the cooking surface is translated linearly on parallel tracks or rails 301 disposed on the front and rear of the cooking unit. The parallel tracks serve as supports and a guides for guide rollers 302 for translating the support and cooking surface. Accordingly, with this embodiment, the parallel tracks and guide rollers are located away from the cooking surface so that they are not in the way of grease droppings and the like. Additionally, the parallel tracks and guide rollers are located away from the burners 197.

In yet another embodiment of the present invention also shown in FIGS. 6 and 7, a stop 303 such as a cotterless pin is fixed to at least one of the parallel tracks 301 (preferably the front track) in a hole 307 disposed in the path of the respective guide rollers so as to secure the support for the cooking surface from inadvertently rolling away from either the heating source or side surface.

In still another embodiment of the present invention as shown in FIG. 7, a stop or restraining pin 304 is fixed to the hood assembly 140 (e.g., to the stationary portion 141) to restrain the rotatable lid portion 143 from fully opening (e.g., from fully opening a full 90 degrees). An added benefit of this feature is to reduce the amount of reach by the user's arm over the burners when opening the hood.

In still another embodiment of the present invention as shown in FIGS. 7, 13A–14B, and 16, the grill has at least two separately controllable burners (e.g., two side burners 197a and center burner 197b shown in FIGS. 13A–14B), and a temperature gauge 305 located over one of the burners. Accordingly, a user can accurately determine the temperature of the air away from a lit burner while cooking indirectly using only one of the burners.

Figure 16:
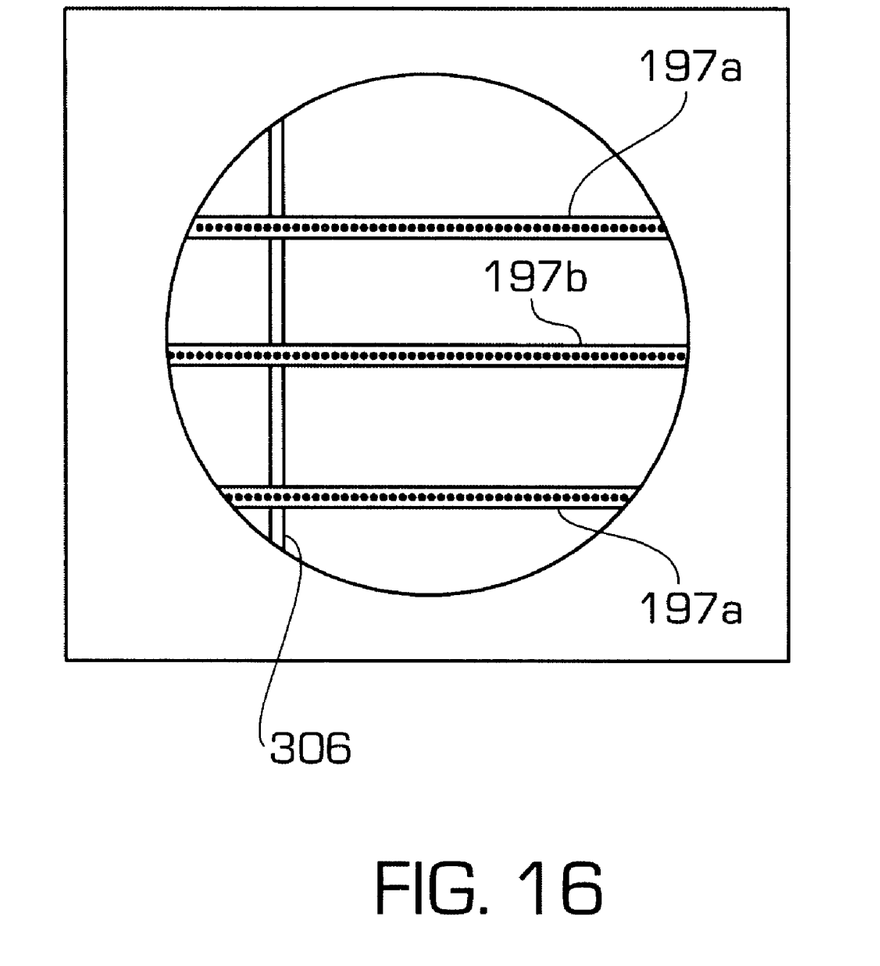
FIG. 16 is a top view illustrating the main burners and a small pilot burner traversing the main burners.

In another embodiment of the present invention as shown in FIG. 16, a small burner 306 serving as a pilot light for lighting the main burners 197a, 197b is positioned to extend under some or all the main burners. For safety, the small burner is fed through a separate valve.

In still another embodiment of the present invention, as illustrated in FIGS. 8–12, a cooking grate 308 is used in place of the conventional cooking grate 110. The grate 308 is designed to be rotatable to provide a Lazy Susan effect. In a preferred configuration, the grate 308 is supported by four extended rods 309. Accordingly, the grate 308 does not require pins placed around its periphery for support. As shown in the figures, the grate 308 rests on top of an opening 310 formed over the burn area. At four points, set ninety degrees apart, the grate is supported on the dished member or deck 105. These four points are formed by extending the rods 309 beyond the perimeter of the circular grate, thereby forming a spread platform. The rods are turned upwards and have knobs or pegs 311 at their respective ends for a user to push the grate around to different positions as in a Lazy Susan. The knobs can be attached to the rods, for example, by inserting the ends of the rods into sleeve portions of the knobs.

Although several exemplary embodiments have been herein shown and described, those of skill in the art will recognize that many modifications and variations are possible, and it is intended to measure the invention only by the appended claims.

What is claimed is:

1. A kitchen for outdoor use, comprising:
   a cooking surface;
   a support for said cooking surface;
   a heat source;
   a front side from which a cook normally accesses said cooking surface for cooking;
   opposing adjacent sides at both ends of said front side; and
   translation means for linearly transporting at least said cooking surface and said support from a first position over said heat source to a second position linearly offset from said heat source, wherein said second position is linearly offset from said heat source in a direction of one of said adjacent sides; and
   wherein said kitchen includes a platform on at least one side of said support when said support is positioned over said heat source and upon which said support rests upon being transported away from said heat source.

2. The kitchen for outdoor use as in claim 1, wherein said offset is such that said cooking surface and said support are transportable to a position wherein no part of said cooking surface or said support remain above said heat source.

3. The kitchen for outdoor use as in claim 1, further comprising a hood unit disposed on a top surface of said support, and transportable together with said support.

4. The kitchen for outdoor se as in claim 1, wherein said translation means includes a frame located beneath a top surface of said support, said frame being supported by conveyance means for transporting said support.

5. The kitchen for outdoor use as in claim 4, wherein said conveyance means comprise wheels or casters.

6. The kitchen for outdoor use as in claim 4, wherein said top surface of said support includes a dished portion sloped toward said cooking surface.

7. The kitchen for outdoor use as in claim 6, wherein said dished portion is formed of stainless steel.

8. The kitchen for outdoor use as in claim 6, wherein at least one side of said support includes a hinged skirt pivotably movable to a position beneath said support.

9. The kitchen for outdoor use as in claim 1, wherein an inner periphery of said support includes a ledge for supporting said cooking surface.

10. The kitchen for outdoor use as in claim 1, further including a housing for containing said heat source, said housing further containing a source of fuel for said heat source.

11. The kitchen for outdoor use as in claim 10, wherein said housing further contains a refrigeration unit.

12. The kitchen for outdoor use as in claim 1, wherein said platform includes a food preparation surface.

13. The kitchen for outdoor use as in claim 1, wherein said platform includes a drip pan.

14. The kitchen for outdoor use as in claim 1, wherein said platform has a length which is equal to or greater than that of said support.

15. The kitchen for outdoor use as in claim 1, further including an auxiliary cooking surface positionable beneath said cooking surface.

16. The kitchen for outdoor use as in claim 1, wherein said heat source includes at least one burner element.

17. The kitchen for outdoor use as in claim 16, wherein said at least one burner element is located within a venturi.

18. The kitchen for outdoor use as in claim 17, further including an auxiliary cooking surface positionable beneath said cooking surface, and wherein said auxiliary cooking surface is supported directly by said venturi.

19. The kitchen for outdoor use as in claim 1, wherein said translation means includes a wheeled transport located beneath at least one portion of said support.

20. The kitchen for outdoor use as in claim 1, wherein said translation means comprises, parallel tracks mounted to the front side and a back side of said kitchen, and guide rollers rotatably mounted to said support for said cooking surface, said guide rollers adapted to ride on said parallel tracks so as to transport said cooking surface and said support from the first position over said heat source to the second position linearly offset from said heat source.

21. The kitchen for outdoor use as in claim 20, further comprising a pin, and a hole formed in at least one of said parallel tracks for inserting said pin, and wherein said pin, when inserted in said hole, prevents the transporting of said cooking surface and said support.

22. The kitchen for outdoor use as in claim 3, further comprising a restraining pin on said hood unit for restraining said hood unit from opening a full ninety degrees from a closed position.

23. The kitchen for outdoor use as in claim 3, further comprising a temperature gauge mounted on said hood unit and offset from a center of said cooking surface.

24. The kitchen for outdoor use as in claim 1, wherein said cooking surface is mounted for rotatable movement over said heat source.

25. The kitchen for outdoor use as in claim 24, wherein said cooking surface has knobs for rotating said cooking surface over said heat source.

26. The kitchen for outdoor use as in claim 1, wherein said heat source comprises at least two main burners, and wherein said kitchen unit further comprises a pilot burner traversing said at least two main burners, and a control valve for controlling a flow of fuel to said pilot burner which is separate from a control valve for controlling a flow of fuel to said main burners.

27. A kitchen for outdoor use, comprising:

a cooking surface;

a support for said cooking surface;

a heat source;

a front side from which a cook normally accesses said cooking surface for cooking; and opposing adjacent sides at both ends of said front side; and wherein said cooking surface and said support are slidably supported to be transported from a first position over said heat source to a second position linearly offset from said heat source wherein said second position is linearly offset from said heat source in a direction of one of said adjacent sides; and wherein said kitchen includes a platform on at least one side of said support when said support is positioned over said heat source and upon which said support rests upon being transported away from said heat source.

28. The kitchen for outdoor use as in claim 27, further comprising, parallel tracks mounted to the front side and a back side of said kitchen, and guide rollers rotatably mounted to said support for said cooking surface, said guide rollers adapted to ride on said parallel tracks so as to transport said cooking surface and said support from the first position over said heat source to the second position linearly offset from said heat source.

29. The kitchen for outdoor use as in claim 28, further comprising a pin, and a hole formed in at least one of said parallel tracks for inserting said pin, and wherein said pin, when inserted in said hole, prevents the transporting of said cooking surface and said support.

30. The kitchen for outdoor use as in claim 27, wherein said cooking surface is mounted for rotatable movement over said heat source.

31. The kitchen for outdoor use as in claim 30, wherein said cooking surface has knobs for rotating said cooking surface over said heat source.

32. The kitchen for outdoor use as in claim 27, wherein said heat source comprises at least two main burners, and wherein said kitchen unit further comprises a pilot burner traversing said at least two main burners, and a control valve for controlling a flow of fuel to said pilot burner which is separate from a control valve for controlling a flow of fuel to said main burners.

* * * * *